Nov. 20, 1956    A. BLOCH    2,771,583
DIFFERENTIAL REPEATER SYSTEM
Filed June 28, 1952

*INVENTOR.*
ALFRED BLOCH
BY
*Laurence B. Dodds*
ATTORNEY

United States Patent Office 2,771,583
Patented Nov. 20, 1956

2,771,583

DIFFERENTIAL REPEATER SYSTEM

Alfred Bloch, Wembley, England, assignor to Hazeltine Research, Inc., Chicago, Ill., a corporation of Illinois Application June 28, 1952, Serial No. 296,233

Claims priority, application Great Britain July 2, 1951

4 Claims. (Cl. 324—123)

*General*

This invention relates to differential amplifiers or repeater systems.

Differential amplifiers are devices used for selectively amplifying a voltage between two points, the potentials of which vary with respect to a fixed reference potential such as ground, the amplifier being theoretically unresponsive to the voltages between each of said two points and the reference point. Such devices may be used for example in making electrical measurements in biological studies or as null detectors in A. C. bridge circuits of the type used for impedance measurements.

One known form of differential amplifier includes a pair of electron-discharge devices such as thermionic tubes or valves each having at least a cathode, an anode and a control electrode or grid, the control grids of the two tubes being arranged to be connected respectively to the two points between which appears the voltage to be amplified and the cathodes of the two tubes being connected to a common point. The two tubes are matched, that is to say they have substantially identical electrical characteristics and are arranged to operate under substantially identical conditions, and their anode currents will therefore differ by an amount depending on the voltage between the two points to which their control grids are connected. Means such as a meter may be provided for indicating directly the difference between the anode currents of the two tubes, or further stages of amplification may be used.

If this form of differential amplifier is used and the common point to which the cathodes of the two tubes are connected is maintained at a fixed potential such as ground, the output of the amplifier will be affected by the magnitude of the voltages between the common point and the control grids of the two tubes when this magnitude increases above a certain range (which will be referred to hereinafter as the small signal range) owing to the impossibility of obtaining absolute identity between the characteristics and operating conditions of the two valves. This disadvantage is particularly apparent if, as is often the case, the voltage between the control grids of the two valves is small in magnitude compared with the voltages between the common point and the control grids of the two valves.

It is an object of the present invention, therefore, to provide a new and improved differential repeater system of the known form referred to above in which the disadvantage of maintaining the common point to which the cathodes of the two valves are connected at a fixed potential is alleviated.

In accordance with a particular form of the invention, a differential repeater system comprises two electron-discharge devices having substantially identical electrical characteristics and including individual anodes, cathodes and control electrodes. The system also includes individual cathode resistors having first terminals connected to individual ones of the aforesaid cathodes and having interconnected second terminals, and a source of potential having a positive terminal connected to the anodes and a negative terminal coupled to a fixed potential point. The differential repeater system also includes an alternating-potential source having a first terminal connected to the aforesaid point and having second and third terminals supplying therebetween an alternating potential having a value small with reference to the potentials developed between the aforesaid second and third terminals and that point. The differential repeater system further includes an input circuit including the aforesaid source and having the second and third terminals coupled between the aforesaid control electrodes for supplying the aforesaid alternating potential to control anode-cathode electron discharges in the devices. The differential repeater system additionally includes an output circuit including a meter coupled to the two devices and responsive to the differences between the magnitudes of the anode-cathode electron discharges therein for deriving an output signal representative of the aforesaid input signal and the difference between the magnitudes of the above-mentioned electron discharges. The repeater system also includes a control apparatus including a cathode-follower repeater having an input circuit connected between one of the aforesaid control electrodes and the interconnected terminals and having one terminal of the cathode resistor thereof connected to the aforesaid point for deriving between the interconnected terminals and the fixed potential point a control potential substantially equal to the aforesaid developed potentials, whereby the aforesaid output signal is substantially unaffected by the value of the aforesaid developed potentials.

For a better understanding of the present invention, together with other and further objects thereof, reference is had to the following description taken in connection with the accompanying drawing, and its scope will be pointed out in the appended claims.

Referring now to the drawing.

Figure 1:
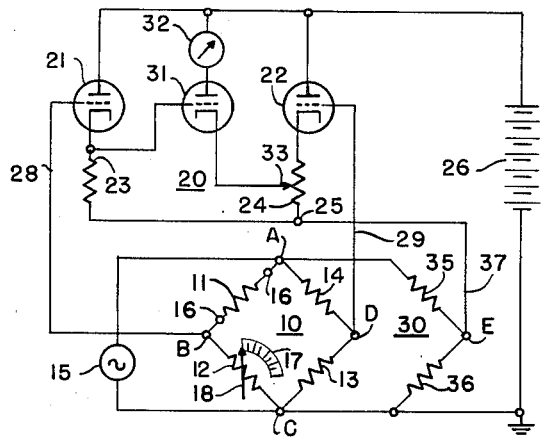
Fig. 1 is a circuit diagram of an impedance-measuring device including a differential repeater system in accordance with the present invention employed as a null detector for the alternating-current bridge circuit of the device.

*Description of impedance-measuring device and differential repeater system of Fig. 1*

Referring now more particularly to Fig. 1 of the drawing, the impedance-measuring device there represented includes an alternating-current bridge circuit 10 of conventional construction consisting of four impedance arms defined by the points A, B, C, and D and comprising impedance elements 11, 12, 13, and 14. These elements may be complex impedances but, for convenience, are represented as resistors, each of which preferably has a relatively high resistance so that the energy dissipated thereby is small. An alternating-voltage source 15 which is capable of generating a voltage of approximately 20 volts is connected across the diagonally disposed or conjugate points A, C of the bridge circuit 10, the point C necessarily being grounded for practical considerations. A pair of terminals 16, 16 are included between the points A and B to facilitate the insertion of the resistor 11 which will be considered as having a value of resistance to be measured. The resistor 12 is adjustable and has a suitable scale 17 associated with the adjustable member 18 of the resistor for providing a direct indication of the resistance of the resistor 11 for various settings thereof.

The impedance-measuring device further includes a differential repeater system 20 which includes two electron-discharge devices or electron tubes such as triodes 21 and 22 having substantially identical electrical characteristics and including individual anodes, cathodes and control electrodes. The tubes 21 and 22 are connected to form cathode-follower amplifiers and include individual cathode resistors 23 and 24, respectively, which have identical resistance values. The resistors just mentioned have first terminals which are connected to individual ones of the cathodes, and also have interconnected second terminals effectively forming a common terminal 25. A suitable source of substantially constant potential which, for convenience of illustration is represented as a battery 26, has its positive terminal connected to the anodes of the tubes 21 and 22 and its negative terminal connected to a fixed potential point such as ground.

The differential repeater system 20 also includes an input circuit coupled between the control electrodes of the tubes 21 and 22 for supplying thereto an input signal having a value which is small with reference to the potentials developed between the control electrodes and ground, for example, a signal having an amplitude of about 0.005 volt as compared with a potential of about 10 volts between the control electrodes and ground, thereby to control anode-cathode electron discharges in the tubes. This input circuit comprises the bridge circuit 10, the conjugate points B and D thereof being connected to the control electrodes of the tubes 21 and 22 by respective conductors 28 and 29.

The repeater system additionally includes an output circuit coupled to the tubes 21 and 22 and responsive to anode-cathode electron discharges therein for deriving an output signal representative of the input signal and the difference between the magnitudes of the electron discharges in those tubes. This circuit may have a variety of forms and, in accordance with one thereof, comprises an electron-discharge device or triode 31, the anode of which is connected to the anode of the tubes 21 and 22 through an alternating-current voltmeter 32, the control electrode of which is connected directly to the cathode of the tube 21, and the cathode of which is connected through an adjustable tap 33 to a suitable point on the cathode resistor 24 of the tube 22.

The differential repeater system 20 further includes a control apparatus 30 including an input circuit coupled to the first-mentioned input circuit or the bridge circuit 10 and including an output circuit coupled between the interconnected terminals or common terminal 25 and the fixed potential point or ground for deriving between the terminal 25 and ground a control potential substantially equal to the potentials developed between the control electrodes of the tubes 21 and 22 and ground, whereby the output signal of the repeater system indicated by the meter 32 is substantially unaffected by the aforesaid developed potentials. This control apparatus comprises a pair of impedances such as resistors 35 and 36 serially connected between the points A and the grounded point C of the bridge circuit 10. Each of these resistors may have a lower value of resistance than that of each of the resistors 11–14, inclusive, of the bridge circuit. The junction of the resistors 35 and 36 is designated as point E and is connected through a conductor 37 to the common terminal 25 of the cathode resistors 23 and 24. The input circuit of the control apparatus 30 thus comprises the serially connected resistors 35 and 36 and the output circuit of this apparatus comprises the resistor 36, its grounded terminal, and the conductor 37. The values of the resistance of resistors 35 and 36 are chosen so that the voltage between the points D and E is substantially zero. This will, in general, necessitate adjustment of the impedance of the elements 35 and 36 when various of the impedances of the bridge circuit 10 are adjusted, but where the impedances in the elements 14 and 13 are fixed, as represented, the impedances of the resistors 35 and 36 will also be fixed and in the same ratio as the elements 14, 13.

*Operation of impedance-measuring device and differential repeater system of Fig. 1*

In considering the operation of the impedance-measuring device of Fig. 1, it will be assumed initially that the resistor 11 having a resistance to be measured is connected between the terminals 16, 16 but that the conductor 37 is connected directly to ground rather than to the point E as represented. The conductor 29 connected to the point D is first disconnected from that point and then connected to the point B so that the control electrode-cathode circuits of the tubes 21 and 22 have the same potential applied thereto, thus causing the anode-cathode electron discharges or currents of these tubes to be substantially identical. The tap 33 of the resistor 24 is then adjusted so that the voltmeter 32 reads zero, thus providing a visual indication that there is no substantial difference between the anode currents of the tubes 21 and 22. After this adjustment, the conductor 29 is reconnected to its original position at point D. Under such circumstances, the bridge circuit 10 ordinarily proves to be unbalanced and a balance is established in the well-known manner by adjusting the member 18 of the resistor 12 so that the meter 32 provides a null or zero reading, thus indicating that the voltage between the points B and D is effectively zero and that the input potentials to the control electrode-cathode circuits of the tubes 21 and 22 are substantially identical. If properly calibrated, the position of the member 18 with reference to the scale 17 then provides a direct indication of the resistance of the resistor 11.

Although the potential difference between the points B and D is substantially zero, those points are cyclically and concurrently fluctuating in potential by approximately 10 volts (representing the alternating voltage developing between the points B and C and points D and C) as a result of the approximately 20 volts alternating potential supplied by the source 15. Thus, the input voltage of the tubes 21 and 22, with reference to ground, varies over a relatively wide range of about 10 volts and the anode-current variations in those tubes are considerably greater than is desired. In practice, the matched tubes 21 and 22 never have identical electrical characteristics, particularly over such a relatively wide range of input voltages of the type just mentioned, and experience has indicated that it is desirable to operate those tubes over a much smaller range of input voltages wherein the operating characteristics of the tube are more nearly identical. This may be effected in accordance with the present invention by connecting the conductor 37 to the point E for the purpose of reducing the range of voltages produced in a portion of the system 20, for example, across the cathode resistor 24 of the tube 22, which reduced voltage range, in turn, reduces the current variation through the resistor 24.

When the conductor 37 is connected to the point E, as represented in Fig. 1, the points D and E are always at substantially the same potential with reference to ground, despite any relatively large voltage excursions of the points B and D with reference to ground resulting from the cyclical variation of the potential applied to the bridge circuit 10 by the source 15. Consequently, the voltage applied between the control electrode of the tube 22 and the common point 25 and, thus, the voltage applied to the input circuit of that tube, has a substantially constant value. However, the voltage between the points B and D and which is applied to the control electrodes of the tubes 21 and 22 may vary over the relatively small range of about 0.005 volt, as previously mentioned, and the tubes 21 and 22 of the system 20 respond to this voltage.

Since the tubes 21 and 22 are connected in cathode-follower amplifier circuits which are characterized by the cathode potentials of the tubes thereof following their control electrode potentials, the instantaneous voltage of the cathode of the tube 22 follows the potential change at point D with reference to point B, and the instantaneous voltage of the cathode of the tube 21 will follow any potential change at point B with reference to point D. Thus, an alternating-current differential signal appearing between the points B and D will be duplicated by a differential signal at the cathodes of the tubes 21 and 22. Since the control electrode of the tube 31 is connected to the cathode of the tube 21 and the cathode of the tube 31 is connected to a point on the cathode resistor 24 of the tube 22, the differential signal on the cathodes of the tubes 21 and 22 will control the anode-current flow in the tube 31 and the voltage indicated by the meter 32. Adjustment of the resistor 12 is then made in the manner previously explained to secure a null reading on the meter 32 and an indication on the scale 17 of the value of the resistor 11.

Figure 2:
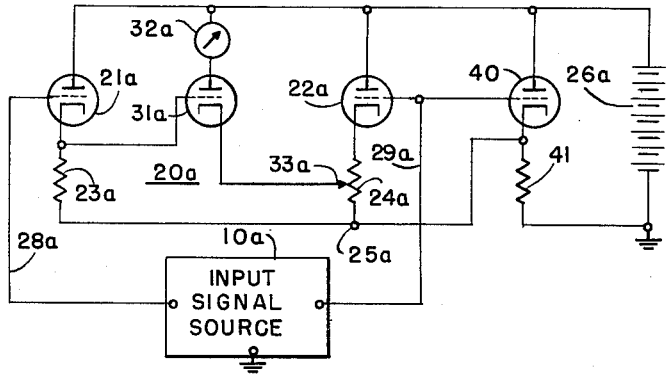
Fig. 2 is a circuit diagram of a modified form of the differential repeater system of Fig. 1.

*Description of differential repeater system of Fig. 2*

Fig. 2 is a circuit diagram representing a modified form of the repeater system which is generally similar to the system 20 of Fig. 1, corresponding elements being designated by the same reference numerals with the suffix *a*. This differential repeater system is of general application and the bridge circuit of Fig. 1 has been replaced by an input signal source 10a. In lieu of the series-connected resistors 35 and 36 of Fig. 1, the system of Fig. 2 employs a third cathode-follower amplifier including an electron tube 40 having its control electrode connected directly to the control electrode of the tube 22a and its cathode connected directly to the common terminal 25a of the cathode resistors 23a and 24a. The anode of the tube 40 is connected to the anode of the tube 22a and a cathode resistor 41, which ordinarily has a resistance that is low with reference to that of the resistors 23a and 24a is connected between the cathode of the tube 40 and ground. Since the cathode potential of the tube 40 closely follows its control-electrode potential, the magnitude of the voltage between the common terminal 25a and the control electrode of the tube 22a will be within a small signal range, and this will also be true of the magnitude of the voltage between the common terminal 25a and the control electrode of the tube 21a when the magnitude of the voltage between the control electrodes of the tubes 21a and 22a is small, as is the case under consideration. Otherwise, the operation of the system 20a is essentially as explained in connection with the system 20 of Fig. 1 and therefore need not be repeated.

Figure 3:
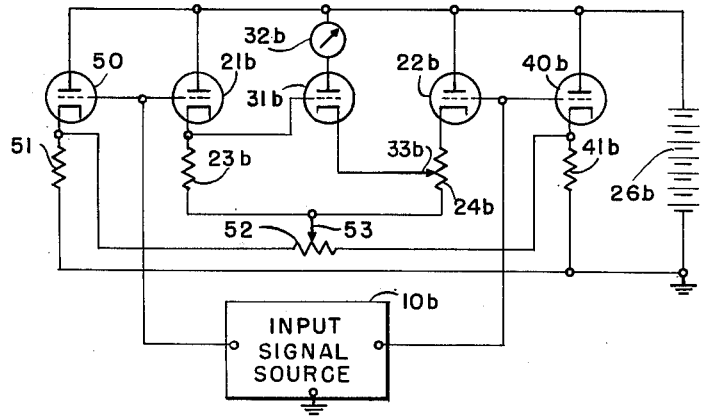
Fig. 3 represents a further modification of the differential repeater system of Fig. 2.

*Description of differential repeater system of Fig. 3*

Fig. 3 of the drawing discloses a differential repeater system which is very similar to that of Fig. 2. Accordingly, corresponding elements are designated by the same reference numerals but having the suffix *b*. In the system of Fig. 3, a fourth cathode-follower amplifier is employed. The anode of its tube 50 is connected to the anodes of the other tubes and the cathode thereof is connected through a cathode resistor 51 to ground. The control electrodes of the tubes 50 and 21b are interconnected and the cathode of the former is also connected to the cathode of the tube 40b through a potential divider 52 having an adjustable tap 53 which is connected to the junction of the cathode resistors 23b and 24b of the tubes 21b and 22b, respectively. The operation of the system of Fig. 3 is essentially the same as that of the system of Fig. 2, the tube 50 functioning for the tube 21b as does the tube 40b for the tube 22b.

From the foregoing descriptions of the various embodiments of the invention, it will be seen that a differential repeater system in accordance with the invention does not possess the disadvantage of prior repeater systems wherein the common terminal of the cathode resistors of the cathode-follower amplifiers are connected to a fixed potential point such as ground.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A differential repeater system comprising: two electron-discharge devices having substantially identical electrical characteristics and including individual anodes, cathodes, and control electrodes; individual cathode resistors having first terminals connected to individual ones of said cathodes and having interconnected second terminals; a source of potential having a positive terminal coupled to said anodes and a negative terminal coupled to a fixed potential point; an alternating-potential source comprising an impedance bridge circuit including a first pair of conjugate terminals, one thereof being connected to said point, and including a second pair of conjugate terminals coupled between said control electrodes for supplying thereto an input signal having a value small with reference to potentials developed between said control electrodes and said point thereby to control anode-cathode electron discharges in said devices; an output circuit including an alternating-current meter coupled to said two devices and responsive to the difference between the magnitudes of said anode-cathode electron discharges therein for deriving an output signal representative of said input signal and the difference between the magnitudes of said discharges; and a control apparatus including a cathode-follower repeater having an input circuit connected between one of said control electrodes and said interconnected terminals and having one terminal of the cathode resistor thereof connected to said point for deriving between said interconnected terminals and said point a control potential substantially equal to said developed potentials, whereby said output signal is substantially unaffected by the value of said developed potentials.

2. A differential repeater system comprising: two electron-discharge devices having substantially identical electrical characteristics and including individual anodes, cathodes, and control electrodes; individual cathode resistors having first terminals connected to individual ones of said cathodes and having interconnected second terminals; a source of potential having a positive terminal coupled to said anodes and a negative terminal coupled to a fixed potential point; an alternating-potential source having a first terminal connected to said point and having second and third terminals supplying therebetween an alternating potential having a value small with reference to potentials developed between said second and third terminals and said point; an input circuit including said source and having said second and third terminals coupled between said control electrodes for supplying thereto said alternating potential to control anode-cathode electron discharges in said devices; an output circuit including a meter, an electron-discharge tube having an anode connected to the anodes of said devices through said meter, a control electrode connected to the cathode of one of said devices, and a cathode connected to the cathode resistor of the other of said devices and responsive to the difference between the magnitudes of said anode-cathode electron discharges in said devices for deriving an output signal representative of said input signal and the difference between the magnitudes of said discharges; and a control apparatus including an electron discharge device having a control electrode and a cathode, a resistor coupled between said last-mentioned cathode and said point, a connection between said last-mentioned control electrode and one of said first-mentioned control electrodes, and a connection between said last-mentioned cathode and said interconnected terminals for deriving between said interconnected terminals and said point a control potential substantially equal to said developed potentials, whereby said output signal is substantially unaffected by the value of said developed potentials.

3. A differential repeater system comprising: two electron-discharge devices having substantially identical electrical characteristics and including individual anodes, cathodes, and control electrodes; individual cathode resistors having first terminals connected to individual ones of said cathodes and having interconnected second terminals; a source of potential having a positive terminal coupled to said anodes and a negative terminal coupled to a fixed potential point; an alternating-potential source having a first terminal connected to said point and having second and third terminals supplying therebetween an alternating potential having a value small with reference to potentials developed between said second and third terminals and said point; an input circuit including said source and having said second and third terminals coupled between said control electrodes for supplying thereto said alternating potential to control anode-cathode electron discharges in said devices; an output circuit including a meter coupled to said two devices and responsive to the difference between the magnitudes of said anode-cathode electron discharges therein for deriving an output signal representative of said input signal and the difference between the magnitudes of said discharges; and a control apparatus including a resistor, an electron-discharge device having a cathode connected through said resistor to said point, and having a control electrode-cathode input circuit coupled between one of said first-mentioned control electrodes and said interconnected terminals for deriving between said interconnected terminals and said point a control potential substantially equal to said developed potentials, whereby said output signal is substantially unaffected by the value of said developed potentials.

4. A differential repeater system comprising: two electron-discharge devices having substantially identical electrical characteristics and including individual anodes, cathodes, and control electrodes; individual cathode resistors having first terminals connected to individual ones of said cathodes and having interconnected second terminals; a source of potential having a positive terminal coupled to said anodes and a negative terminal coupled to a fixed potential point; an alternating-potential source having a first terminal connected to said point and having second and third terminals supplying therebetween an alternating potential having a value small with reference to potentials developed between said second and third terminals and said point; an input circuit including said source and having said second and third terminals coupled between said control electrodes for supplying thereto said alternating potential to control anode-cathode electron discharges in said devices; an output circuit including a meter coupled to said two devices and responsive to the difference between the magnitude of said anode-cathode electron discharges therein for deriving an output signal representative of said input signal and the difference between the magnitudes of said discharges; and a control apparatus including a cathode-follower repeater having an input circuit connected between one of said control electrodes and said interconnected terminals and having one terminal of the cathode resistor thereof connected to said point for deriving between said interconnected terminals and said point a control potential substantially equal to said developed potentials, whereby said output signal is substantially unaffected by the value of said developed potentials.

References Cited in the file of this patent

UNITED STATES PATENTS

| | | |
|---|---|---|
| 1,907,487 | Booth | May 9, 1933 |
| 2,316,044 | Blair | Apr. 6, 1943 |
| 2,324,215 | Kinsburg | July 13, 1943 |
| 2,434,823 | Van Beuren et al. | Jan. 20, 1948 |
| 2,508,996 | Elam | May 23, 1950 |
| 2,521,828 | Chatterton et al. | Sept. 12, 1950 |
| 2,604,382 | Woodruff | July 22, 1952 |

OTHER REFERENCES

Radio Electronics, vol. XXII, issue 12, pages 30–35; publication date, September 1951. (Copy in Div. 69.)